United States Patent
Mordukhovich

(10) Patent No.: US 9,677,436 B2
(45) Date of Patent: Jun. 13, 2017

(54) SUMP HAVING TEMPERATURE-CONTROLLED JALOUSIE DIVIDER

(71) Applicant: AVL Powertrain Engineering, Inc., Plymouth, MI (US)

(72) Inventor: Gregory Mordukhovich, Bloomfield Hills, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 63 days.

(21) Appl. No.: 14/681,214

(22) Filed: Apr. 8, 2015

(65) Prior Publication Data

US 2015/0300220 A1    Oct. 22, 2015

Related U.S. Application Data

(60) Provisional application No. 61/980,222, filed on Apr. 16, 2014.

(51) Int. Cl.
*F01M 11/00* (2006.01)
*F01M 5/00* (2006.01)
(Continued)

(52) U.S. Cl.
CPC ........ *F01M 11/0004* (2013.01); *F01M 5/005* (2013.01); *F16H 57/0452* (2013.01);
(Continued)

(58) Field of Classification Search
CPC .. F01M 5/005; F01M 5/007; F01M 2005/023; F01M 2011/0037; F01M 2011/0045; F16H 57/0452; F16H 57/0453
See application file for complete search history.

(56) References Cited

U.S. PATENT DOCUMENTS 1,566,438 A   12/1925 Smith
1,892,185 A   12/1932 Clements
(Continued)

FOREIGN PATENT DOCUMENTS

WO    2007126750 A2    11/2007

OTHER PUBLICATIONS

U.S. Appl. No. 14/681,245, filed Apr. 8, 2015, Gregory Mordukhovich.

*Primary Examiner* — Minh Truong
(74) *Attorney, Agent, or Firm* — Harness, Dickey & Pierce, P.L.C.

(57) ABSTRACT

A baffle for disposition in a sump having a fluid containing cavity is disclosed. A first portion of the baffle has an outside edge abutting a side wall of the sump and an inner edge defining an opening. A second portion of the baffle extends downwardly from the inner edge to a lower edge abutting a bottom wall of the sump. At least one jalousie divider is disposed along the second portion of the baffle to regulate fluid flow through the baffle based on fluid temperature. A controller is coupled to the jalousie divider to selectively drive the jalousie divider to a closed position that prevents fluid flow through the baffle when the fluid temperature is below a temperature threshold and an open position that permits fluid flow through the second portion of the baffle when the fluid temperature is above the temperature threshold.

28 Claims, 5 Drawing Sheets

(51) Int. Cl.
*F16H 57/04* (2010.01)
*F01M 5/02* (2006.01)

(52) U.S. Cl.
CPC ... *F16H 57/0453* (2013.01); *F01M 2005/023* (2013.01); *F01M 2011/0045* (2013.01)

(56) References Cited

U.S. PATENT DOCUMENTS

| | | | |
|---|---|---|---|
| 2,018,724 A * | 10/1935 | Illsley | B60K 11/085 236/35.3 |
| 2,245,672 A * | 6/1941 | Hunt | F02M 1/12 261/39.1 |
| 2,297,355 A * | 9/1942 | Hughes | F02M 1/10 123/378 |
| 2,540,628 A * | 2/1951 | Miller | F01M 5/007 236/12.23 |
| 3,121,473 A | 2/1964 | Blystone | |
| 4,134,380 A * | 1/1979 | Niwa | F01M 5/005 123/142.5 E |
| 4,258,679 A | 3/1981 | Leitermann | |
| 4,296,716 A | 10/1981 | Hofbauer et al. | |
| 5,038,890 A | 8/1991 | Tanaka et al. | |
| 5,301,642 A * | 4/1994 | Matsushiro | F01M 5/001 123/142.5 R |
| 6,299,561 B1 * | 10/2001 | Kramer | F16H 57/0447 184/13.1 |
| 6,705,270 B1 | 3/2004 | Rau et al. | |
| 7,654,241 B2 | 2/2010 | Kobayashi et al. | |
| 7,946,388 B2 * | 5/2011 | Kobayashi | F01M 5/02 184/1.5 |
| 9,297,322 B2 * | 3/2016 | Hokuto | F01M 11/0004 |
| 2003/0029412 A1 | 2/2003 | Kato et al. | |
| 2004/0177827 A1 | 9/2004 | Hoyte et al. | |
| 2008/0066982 A1 * | 3/2008 | Kobayashi | F01M 5/001 180/69.1 |
| 2009/0020366 A1 * | 1/2009 | Mori | F01M 5/001 184/106 |
| 2011/0011367 A1 | 1/2011 | Staley et al. | |
| 2013/0074798 A1 | 3/2013 | Shaffer | |
| 2013/0248293 A1 | 9/2013 | Mordukhovich et al. | |
| 2013/0312696 A1 | 11/2013 | Mordukhovich | |

* cited by examiner

SUMP HAVING TEMPERATURE-CONTROLLED JALOUSIE DIVIDER

CROSS-REFERENCE TO RELATED APPLICATIONS

This application claims the benefit of U.S. Provisional Application No. 61/980,222, filed on Apr. 16, 2014. This application is related to U.S. patent application Ser. No. 14/681,245, filed on Apr. 8, 2015. The entire disclosures of the above applications are incorporated herein by reference.

FIELD

The present disclosure generally relates to fluid-filled sumps, including without limitation, engine sumps and transmission sumps used in motor vehicles. More particularly, a temperature controlled baffle for disposition in a sump is disclosed.

BACKGROUND

This section provides background information related to the present disclosure which is not necessarily prior art.

In recent years, transmissions have been developed featuring a large number of forward gears to allow for engine downsizing due to an increasing desire for improved fuel economy in automobiles and other vehicles. Smaller engines coupled to seven, eight, and nine speed transmissions are now common place. While a decrease in combustion volume leads to a proportional decrease in the size and mass of an engine, the volume of oil required does not decrease as much. Shorter residence times for the oil and higher engine speeds associated with smaller engines increase the probability of oil aeration, which can have a negative effect on the durability of the engine. Friction losses related to viscous drag also become more significant in smaller engines because engine downsizing typically leads to an increase in the thermal efficiency of the engine.

To compensate for the increase in oil aeration probability and frictional losses related to viscous drag, oil volume cannot be decreased proportionally with engine size. That is, smaller engines require proportionally more oil volume compared to larger engines. Smaller engines also deliver less torque to the drivetrain and generate less heat. Because smaller engines apply less thermal energy to proportionally more oil, it takes considerably longer for the engine to warm up the oil circulating through the engine and other drivetrain components such as the transmission.

Newer engines are also being equipped with engine start/stop features to improve fuel economy and emissions during city driving. Engine start/stop features automatically turn the engine off when the vehicle is brought to a rest and then automatically start the engine again when the accelerator is pressed and travel is resumed. With the engine turned off when the vehicle is at rest, oil is not circulating in the engine or the transmission leading to a longer period of time before the oil is warmed up to ideal operating temperatures. In other words, when the engine duty cycle includes multiple relatively short running cycles, the temperature of the oil in the engine and the transmission rises more slowly and a greater part of the engine's run time is spent with oil temperatures being below ideal operating temperatures. This is problematic because the viscosity of the oil that circulates through the engine and drivetrain varies with temperature. Specifically, the viscosity of such oils generally decreases (become less resistant to flow or is "thinner") as temperature increases. Low viscosity is generally favored provided that sufficient lubricity is maintained because high viscosity (where the oil is more resistant to flow or is "thicker") leads to an increase in viscous drag related losses and an attendant decrease in efficiency. These losses off-set much of the efficiency gains that can be realized through engine downsizing and engine start/stop features. Short engine running cycles also may not allow for the appropriate evaporation of water and fuel out of the oil contained in the oil sump of the engine, potentially leading to problems with oil overflow, excessive aeration, additional churning losses, and restrictions in the oil pickup due to ice crystals forming on the pickup inlet screen during cold weather operation.

Recently, new oil sumps for engines have been designed to address these problems. One such oil sump design, also developed by the inventor to the present disclosure, is disclosed in U.S. Patent Application Publication 2013/0312696 entitled "Temperature-Controlled Segregation of Hot and Cold Oil in a Sump of an Internal Combustion Engine." The oil sump disclosed in this reference includes a porous separator disposed in the oil sump for separating the oil sump into hot and cold oil volumes during an engine cold start. The porous separator is arranged to create a trough-like volume around an oil pickup. The engine oil in this trough-like volume is isolated from the cold engine oil disposed in the rest of the oil sump until the temperature of the cold engine oil is raised to a temperature where its viscosity permits passage through orifices in the porous separator. Accordingly, the temperature of the circulating engine oil can be raised in a quicker manner after engine cold starts. However, the porous separator of this design relies on the temperature dependence of the viscosity of the engine oil to effectively function. The diameter of the orifices in the porous separator is selected to work with a particular engine oil based on its viscosity at a particular temperature threshold. This limits the flexibility of the design since only certain engine oils can be used and the temperature threshold of any given oil/orifice size combination cannot be changed. Other drawbacks arise from the structure of the porous separator itself, which could become clogged with large particulates suspended in the engine oil or by ice crystals forming in the orifices of the porous separator.

An alternative engine oil sump design is disclosed in U.S. Patent Application Publication 2011/0011367 entitled "Apparatus and Method for Rapid Warming of the Oil in an Oil Pan of an Internal Combustion Engine." The engine oil sump disclosed in this reference includes a fixed gap disposed between a baffle and the wall of the oil sump that controls the flow of the engine oil depending on its viscosity. This reference suggests finding a gap size that effectively provides separation of cold and hot engine oil and that does not restrict maximum flow of the engine oil at elevated temperatures. However, for many engine oils, finding such a gap size may not be feasible. Either separation of the hot and cold engine oil will not be effective or the gap size will be too small and will restrict the maximum flow of the engine oil at elevated temperatures. Restricting the maximum flow of engine oil at elevated temperatures may lead to pickup starvation, aeration, and, thus, possible damage to the engine. If, on the other hand, the gap size is too large, the temperature of the engine oil will not rise fast enough to have an effect on the efficiency of the engine.

What is needed is a baffle design that can universally control the separation of hot oil and cold oil in an oil sump regardless of the particular oil that is used and that does not restrict oil flow within the oil sump at elevated temperatures.

SUMMARY

This section provides a general summary of the disclosure, and is not a comprehensive disclosure of its full scope or all of its features.

The subject disclosure provides a baffle for disposition inside a fluid-filled sump where the baffle includes at least one jalousie divider. The baffle segregates the sump into a first volume and a second volume. The first volume accommodates a fluid pickup that draws fluid from the sump for circulation. The second volume is generally disposed outwardly of the first volume. The at least one jalousie divider is moveable to regulate fluid flow through the baffle and between the first volume and the second volume based on fluid temperature. More particularly, the at least one jalousie divider is movable between a closed position and an open position. In the closed position, the at least one jalousie divider prevents fluid flow between the first volume and the second volume. In the open position, the at least one jalousie divider permits fluid flow between the first volume and the second volume. A controller is coupled to the at least one jalousie divider and adjusts the position of the at least one jalousie divider to regulate fluid flow between the first volume and the second volume. The controller selectively drives the at least one jalousie divider to the closed position in response to the temperature of the fluid in the first volume being below a temperature threshold. Similarly, the controller selectively drives the at least one jalousie divider to the open position in response to the temperature of the fluid in the first volume being above the temperature threshold. By selectively segregating the sump into two volumes, the at least one jalousie divider minimizes fluid warm-up times in engines or transmissions.

When the temperature of the fluid in the first volume is below the temperature threshold, the at least one jalousie divider is driven to the closed position and acts as a barrier isolating the fluid contained within the second volume from the fluid contained within the first volume. With the first volume surrounding the fluid pickup, only the fluid contained within the first volume is circulated though the engine or transmission when the temperature of the fluid in the first volume is below the temperature threshold. Thus, the fluid in the first volume is warmed up more rapidly by the engine or transmission, creating a hot zone of fluid within the sump that is co-extensive with the first volume. The second volume thus designates a cold zone and the fluid contained in the second volume is not circulated until after the fluid in the first volume reaches or exceeds the temperature threshold and the at least one jalousie divider is driven to the open position. Accordingly, the combined volume of the first volume and the second volume is only utilized when the temperature of the fluid in the first volume meets or exceeds the temperature threshold.

Advantageously, this baffle design that can universally control the separation of hot and cold fluid in the sump regardless of the properties of the particular fluid that is used. Because the operation of the at least one jalousie divider does not depend on any properties of the fluid, such as viscosity, the baffle is compatible for use with a wide range of fluids. Further, the structure of the at least one jalousie divider provides minimal flow disturbance in the open position and does not restrict fluid flow within the sump in the open position. The structure of the at least one jalousie divider also resists clogging because the at least one jalousie divider is movable and presents a relatively large opening in the baffle in comparison to screens or small gaps in the baffle that control flow based on the viscosity of the fluid.

Finally, the at least one jalousie divider can be dynamically controlled by the controller to throttle the fluid flow between the first volume and the second volume by driving the at least one jalousie divider to a plurality of intermediate positions ranging between the open position and the closed position. Accordingly, the temperature of the fluid contained in the second volume can be raised more quickly by gradually increasing fluid flow to and from the second volume.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
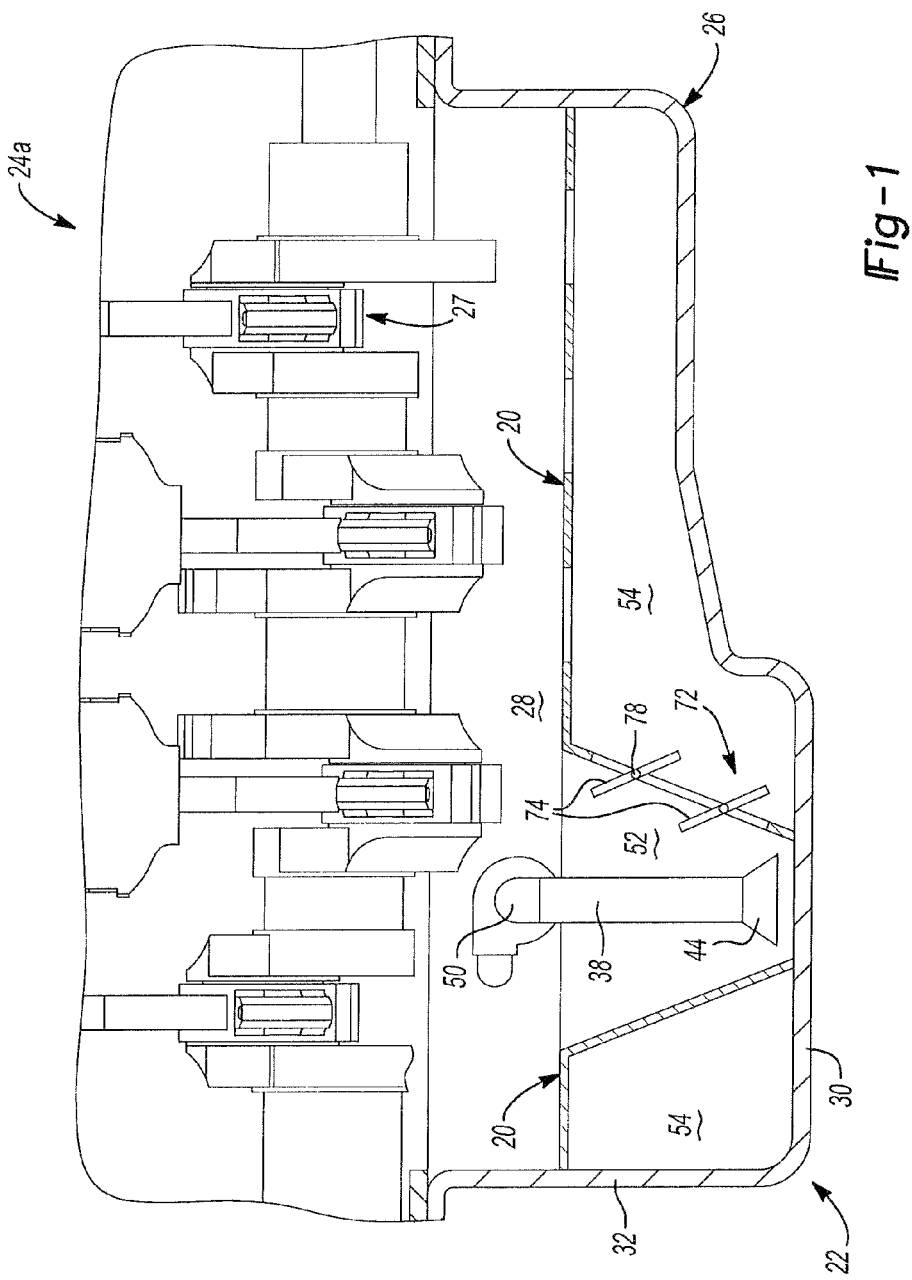
FIG. 1 is a partial cut-away view of a sump mounted to an engine illustrating an exemplary baffle constructed in accordance with the present disclosure.

Referring to the Figures, wherein like numerals indicate corresponding parts throughout the several views, a baffle 20 for disposition in a sump 22 is disclosed. The sump 22 is generally configured to collect and contain a fluid 23, such as engine oil or transmission fluid, that falls from a fluid circulating system 24 in the form of droplets 25 (see FIGS. 4 and 5). It should be appreciated that the term "fluid" as used throughout the present disclosure generally refers to any fluid, including without limitation engine oil and transmission fluid. Accordingly, the fluid circulating system 24 may be, without limitation, an engine 24a (FIG. 1) or a transmission 24b (FIG. 2) in a motor vehicle.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
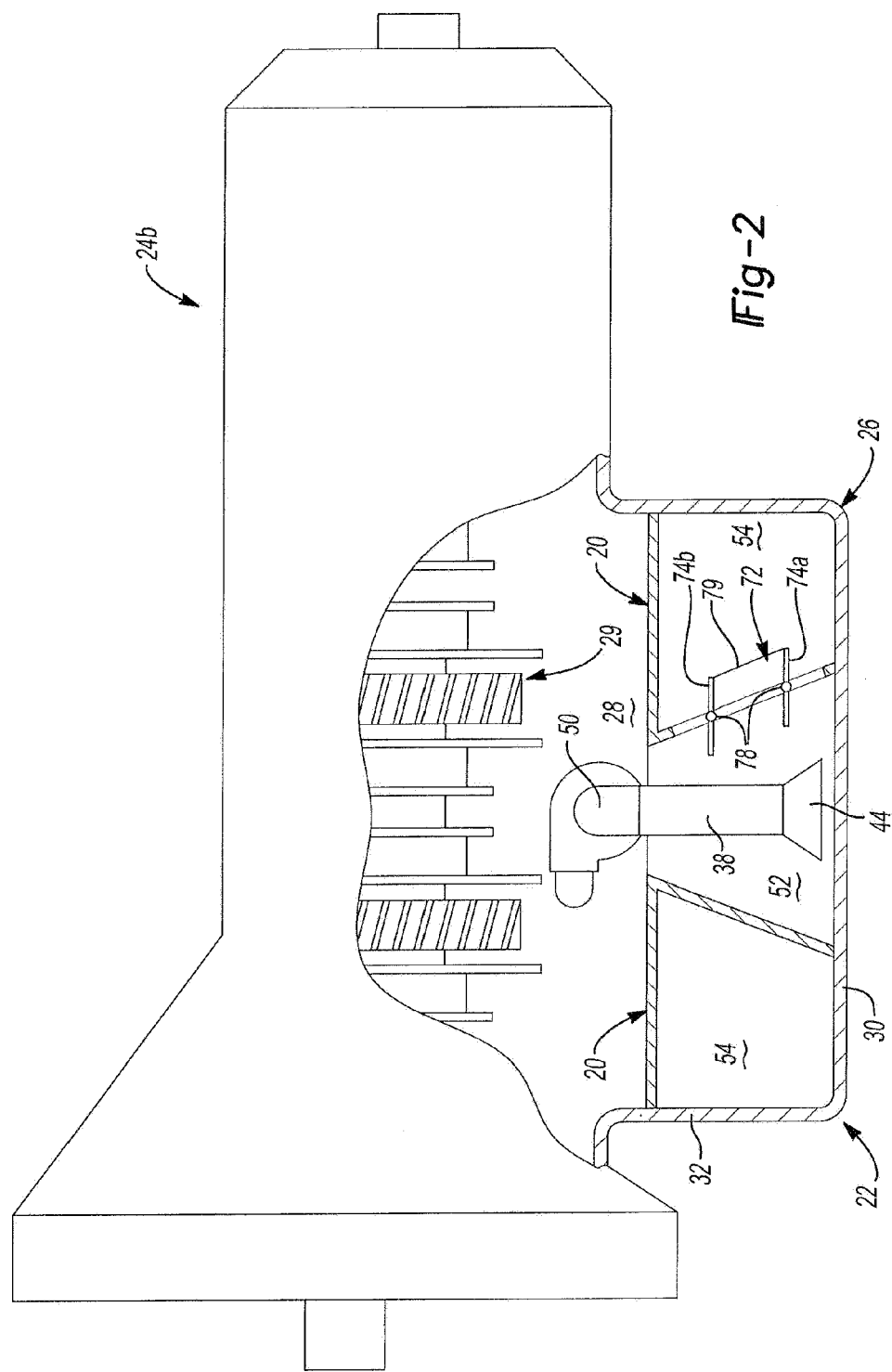
FIG. 2 is a partial cut-away view of a sump mounted to a transmission illustrating another exemplary baffle constructed in accordance with the present disclosure.

Referring to FIG. 1, the disclosed sump 22 may be part of engine 24a. The engine 24a may be without limitation a spark-ignition engine (e.g., gasoline engine) or a compression-ignition engine (e.g., diesel engine), both of which rely on engine oil for lubrication. Referring now to FIG. 2, the disclosed sump 22 may alternatively be part of transmission 24b. The transmission 24b may be without limitation an automatic transmission, a manual transmission, a dual clutch transmission, or a continuously variable transmission, all of which rely on transmission fluid for lubrication. Such engines and transmissions are commonly utilized in motor vehicles such as automobiles, but other applications are envisioned and are within the scope of the present disclosure.

Referring generally to FIGS. 1-5, the sump 22 of the present disclosure includes a housing 26 that presents a cavity 28. The housing 26 of the sump 22 collects fluid 23 after it is circulated within the oil circulating system 24, which may be, without limitation, the engine 24a or the transmission 24b of a vehicle. Gravity drains the fluid 23 from the engine 24a or the transmission 24b, which are generally disposed above the sump 22 such that droplets 25 of the fluid 23 fall from the engine 24a or the transmission 24b and into the cavity 28 of the housing 26.

The fluid 23 may be organic, synthetic, or a blend of organic and synthetic oil with particular lubrication and hydraulic characteristics. Apart from other measurable characteristics, such fluids have a temperature and a viscosity that varies with temperature. That is, the viscosity of such fluids generally decreases (becomes less resistant to flow or becomes "thinner") as temperature increases. In both an engine and a transmission, low viscosity is generally favored provided that sufficient performance of the fluid is maintained because high viscosity (where the fluid is more resistant to flow or is "thicker") leads to an increase in viscous drag related losses and an attendant decrease in efficiency. Stated another way, engines and transmissions are most efficient when the fluid that circulates through them is warmed to a target operating temperature.

In the engine 24a (FIG. 1), the internal combustion process creates significant heat that warms the circulating engine oil. Also, internal components 27 of the engine 24a are driven by the internal combustion process and movement of these components 27 produces heat through friction. The heat produced by friction also warms the circulating engine oil. In the transmission 24b (FIG. 2), the rotation of a gearset 29 creates friction which in turn produces heat. During operation, this heat warms the transmission fluid as it is circulated through the transmission 24b.

The relationship between the fluid temperature and the efficiency of engines and transmissions has become problematic in recent years due to an increasing desire for improved fuel economy in automobiles and other vehicles. Transmissions have been developed with a large number of forward gears to allow for engine downsizing. Smaller engines coupled to seven, eight, and nine speed transmissions are now common place. While a decrease in combustion volume leads to a proportional decrease in the size and mass of an engine, the volume of oil required does not decrease as much. Shorter residence times for the oil and higher engine speeds associated with smaller engines increase the probability of oil aeration, which can have a negative effect on the durability of the engine. Friction losses related to viscous drag also become more significant in smaller engines because engine downsizing typically leads to an increase in the thermal efficiency for the engine. To overcome engine downsizing drawbacks, including the increase in oil aeration probability and frictional losses related to viscous drag, oil volume cannot be decreased proportionally with engine size. That is, smaller engines require proportionally more oil volume compared to larger engines. Typically, smaller engines also deliver less torque to the drivetrain and generate less heat. Because smaller engines apply less thermal energy to proportionally more oil, it takes considerably longer for the engine to warm up the oil circulating through the engine and other drivetrain components such as the transmission. The packaging for transmissions with a large number of forward gears is also typically larger in size and requires more transmission fluid than traditional transmissions that have four forward gears, for example. This increase in transmission fluid volume also increases the amount of time that it takes for the transmission fluid in the transmission to warm up to the target operating temperature.

Newer engines are also being equipped with engine start/stop features to improve fuel economy during city driving. Such engine start/stop features automatically turn off the engine when the vehicle is brought to rest and then automatically start the engine when the accelerator is pressed and travel is resumed. With the engine producing no heat energy and with no components of the engine or transmission rotating when the engine is turned off, the oil in the engine and the transmission fluid in the transmission is not warmed when a vehicle equipped with an engine start/stop feature is at rest. Therefore, it takes more time for the oil and transmission fluid to warm up to the target operating temperature. In other words, when the engine duty cycle includes multiple relatively short running cycles, the temperature of the oil in the engine and the temperature of the transmission fluid in the transmission is lower temperatures during a greater part of the engine's run time. What this means is that the engine and transmission are not operating at peak efficiency much of the time because the oil in the engine and the transmission fluid in the transmission has not been elevated to the target operating temperature for most or all of a trip. The attendant viscous drag related losses associated with low temperatures and high viscosity off-set much of the efficiency gains that can be realized through engine downsizing and engine start/stop features.

Figure 3:
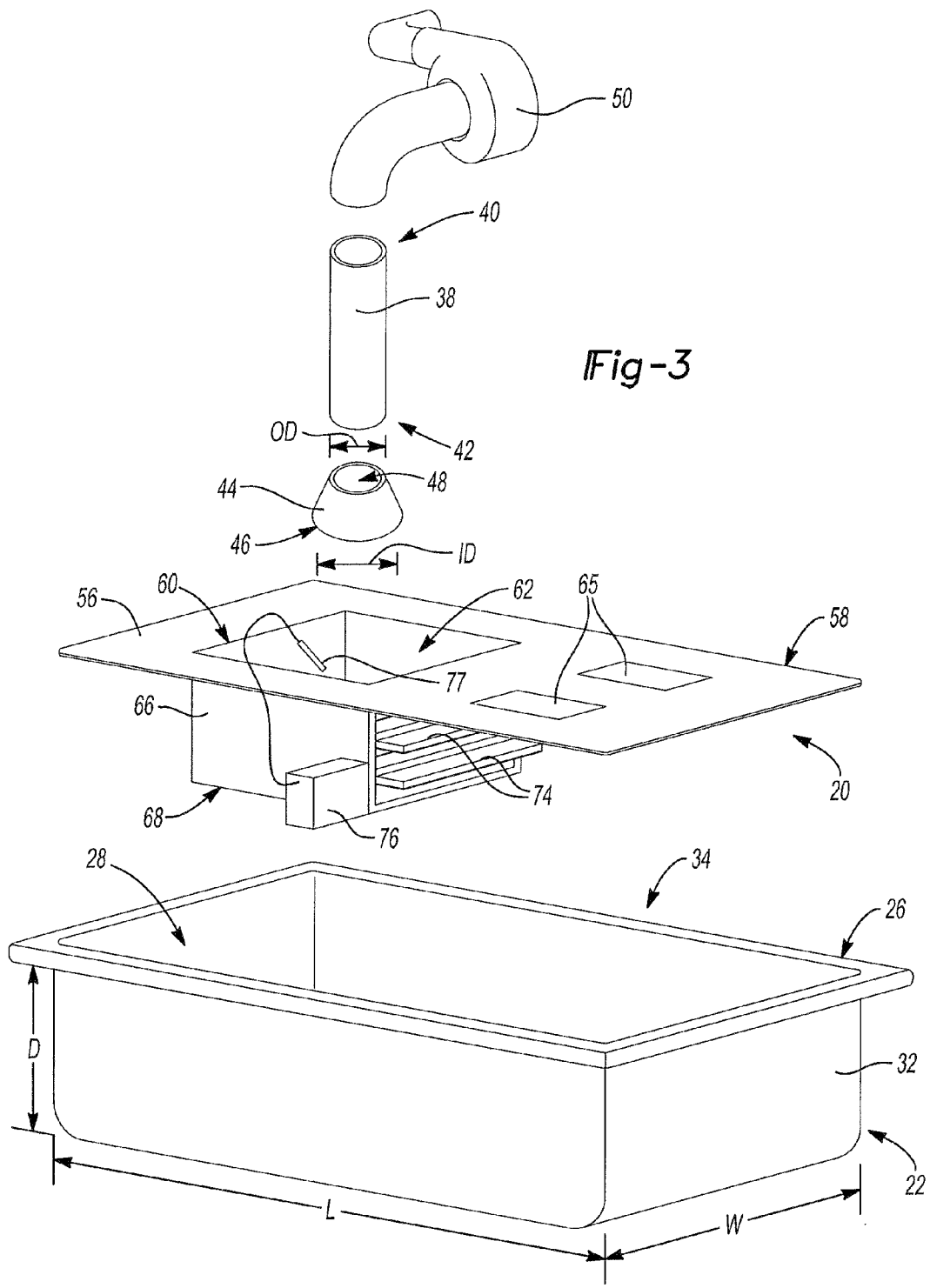
FIG. 3 is an exploded perspective view of a sump illustrating another exemplary baffle constructed in accordance with the present disclosure.

Referring to FIG. 3, the dimensions of the sump 22 are dependent upon the cavity 28, which has a horizontal extent, a vertical extent, and a total volumetric capacity. The housing 26 includes a bottom wall 30 and a side wall 32 that circumscribes the horizontal extent of the cavity 28 to define an open top 34. It should be appreciated that the bottom wall 30 and the side wall 32 of the housing 26 may be integrally formed as one piece. Further, the bottom wall 30 may be substantially flat as illustrated in the FIG. 3 or it may be contoured as illustrated in FIG. 1. The side wall 32 may be uniform, wrapping around the cavity 28 of the housing 26 or, alternatively, the side wall 32 may be comprised of a plurality of wall sections that are joined together. It should also be appreciated that the side wall 32 may be substantially vertical as illustrated in the Figures or, alternatively, the side wall 32 may rise up at a fixed or variable angle with respect to the vertical.

The horizontal extent of the cavity 28 may be described as a cross-sectional plane extending along a width W and a length L of the cavity 28. The vertical extent of the cavity 28 is bounded by the bottom wall 30 of the housing 26 and the open top 34. Accordingly, the vertical extent of the cavity 28 may equal a depth D of the cavity 28. Generally and without limitation, the vertical extent of the cavity 28 is significantly shorter where the sump 22 is configured for use in a transmission 24. By comparison, the vertical extent of the cavity 28 is significantly taller where the sump 22 is configured for use in an engine 24a. For example, the vertical extent of the cavity 28 in the transmission 24b may range between approximately three and four inches while the vertical extent of the cavity 28 in the engine 24a may range between approximately seven and eight inches.

Figure 4:
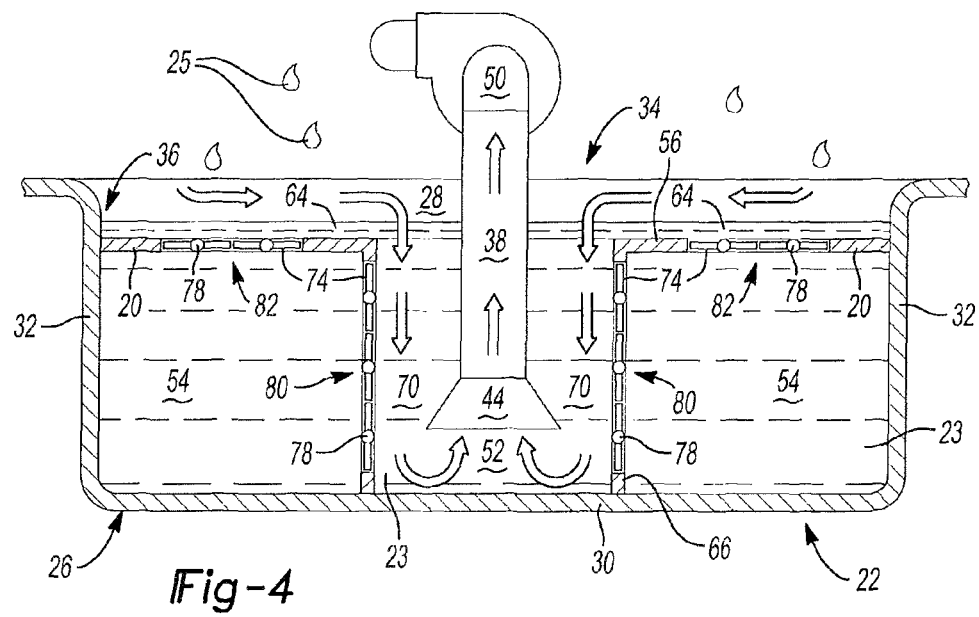
FIG. 4 is a cross-sectional view of a sump illustrating another exemplary baffle submersed in a low temperature fluid.
Figure 5:
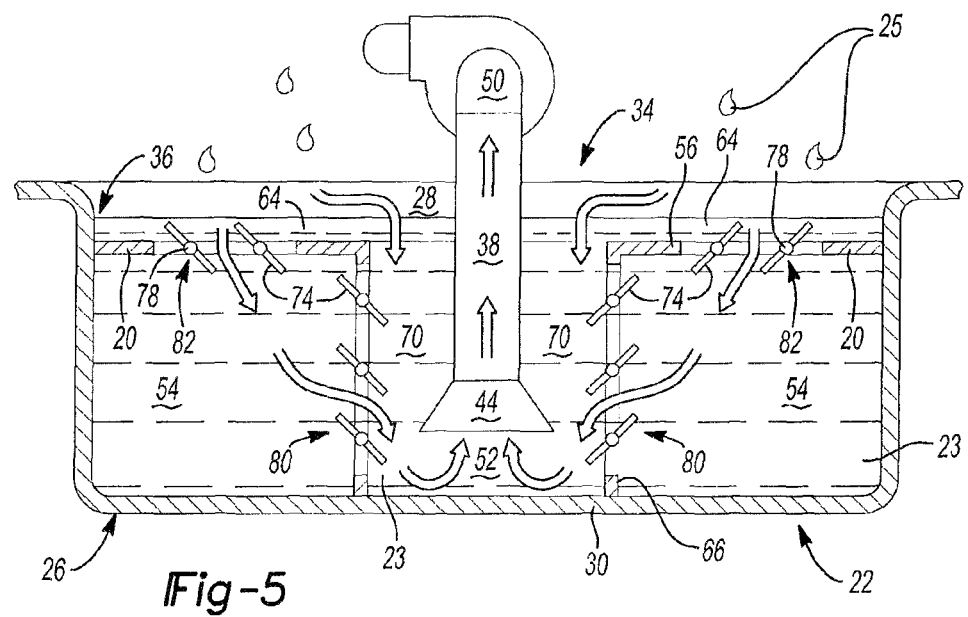
FIG. 5 is a cross-sectional view of an oil sump illustrating the exemplary baffle of FIG. 4 submersed in a high temperature fluid.

Referring to FIGS. 4 and 5, the housing 26 also has a minimum fluid level 36 for the fluid 23 disposed in the cavity 28. The minimum fluid level 36 may generally be measured when the vehicle is resting on a horizontal surface such that the sump 22 is not tilted with respect to the horizontal. As such, the minimum fluid level 36 is simply a measurement reflecting the minimum amount of fluid 23 that remains in the cavity 28 when the fluid 23 is circulating through the fluid circulating system.

With reference to FIG. 3, the sump 22 also includes a suction tube 38 extending downwardly into the cavity 28 toward the bottom wall 30 of the housing 26. The suction tube 38 communicates fluid from the cavity 28 to the engine 24a or the transmission 24b. The suction tube 38 has a proximal end 40 that extends beyond the open top 34 of the sump 22 and a distal end 42 opposite the proximal end 40. The distal end 42 of the suction tube 38 may be spaced from the bottom wall 30 of the housing 26. A fluid pickup 44 is connected to the distal end 42 of the suction tube 38. Thus, the fluid pickup 44 is disposed within the cavity 28 of the housing 26 at or near the bottom wall 30 to draw in fluid from a region adjacent to the bottom wall 30. The fluid pickup 44 has a funnel shape with an inlet 46 facing the bottom wall 30 and an outlet 48 connected to the distal end 42 of the suction tube 38.

The inlet 46 of the fluid pickup 44 has an inlet diameter ID and the outlet 48 of the fluid pickup 44 has an outlet diameter OD that is smaller than the inlet diameter ID. The sump 22 further includes a pump 50 connected to the proximal end 40 of the suction tube 38. The pump 50 pulls fluid from the sump 22 via the fluid pickup 44 and through the suction tube 38 and supplies the fluid to the engine 24a or the transmission 24b for circulation therein. As shown in FIGS. 4 and 5, the fluid 23 then returns to the sump 22 in the form of droplets 25 falling from the engine 24a or the transmission 24b under the influence of gravity.

Referring again to FIGS. 1 and 2, the baffle 20 of the present disclosure is disposed inside the housing 26 and divides the cavity 28 into a first volume 52 and a second volume 54. The first volume 52 is disposed around the fluid pickup 44 and the suction tube 38 and is open to the open top 34. The second volume 54 is outward of the first cavity 28 and is generally disposed adjacent the side wall 32. In other words, the second volume 54 may generally be described as being disposed between the side wall 32 and the first volume 52.

Referring again to FIG. 3, the baffle 20 includes a first portion 56 having an outside edge 58 abutting the side wall 32 and an inner edge 60 spaced inwardly of the outside edge 58 to define an opening 62 in the first portion 56 of the baffle 20. In one arrangement, the inner edge 60 is spaced about and circumscribes the suction tube 38. The first portion 56 of the baffle 20 generally defines an upper region 64 of the first volume 52 adjacent the open top 34 of the cavity 28 and above the first portion 56 of the baffle 20 and the opening 62. Although other shapes are considered within the scope of the present disclosure, the first portion 56 of the baffle 20 may generally be flat to create a pool of fluid across the entire horizontal extent of the cavity 28 and within the upper region 64 of the first volume 52 to collect falling droplets 25 of fluid 23 (see FIGS. 4 and 5). The first portion 56 of the baffle 20 also spans the horizontal extent of the cavity 28 below the minimum fluid level 36 of the housing 26 to direct the fluid returning from the fluid circulating system 24 (e.g., the engine 24a or the transmission 24b) toward the opening 62 in the first portion 56 of the baffle 20. The first portion 56 of the baffle 20 may also include one or more windows 65 that extend through the first portion 56 of the baffle 20. The windows 65 allow fluid to flow from the upper region 64 of the first volume 52 into the second volume 54 (see FIGS. 4 and 5).

The baffle 20 also includes a second portion 66 extending downwardly from the inner edge 60 of the first portion 56 to a lower edge 68 abutting the bottom wall 30 of the housing 26. As such, the second portion 66 of the baffle 20 defines a lower region 70 of the first volume 52 that directs the fluid in the first volume 52 from the opening 62 in the first portion 56 of the baffle 20 toward the fluid pickup 44. The second portion 66 of the baffle 20 may take the form of several different shapes. By way of example and without limitation, FIG. 3 shows a configuration where the second portion 66 of the baffle 20 has a rectangular shape. It should be appreciated that the lower region 70 of the first volume 52 may have the shape of a polyhedron, including a hexahedron such as a cube, parallelepiped, and cuboid or alternatively may have the shape of a pentahedron such as a triangular prism. In another alternative configuration, the second portion 66 of the baffle 20 may have the shape of an isosceles trapezoid such that the lower region 70 of the first volume 52 has a pyramid-like shape such as a quadrilateral frustum or a pyramidal frustum. As shown in FIG. 1, the lower region 70 of the first volume 52 may become increasingly narrow progressing from the opening 62 to the lower edge 68. Such a configuration may find utility where the sump 22 is connected to an engine. In another configuration tailored to applications where the sump 22 is connected to a transmission, such as the sump 22 shown in FIG. 2, the second portion 66 of the baffle 20 may become increasingly wide progressing from the opening 62 to the lower edge 68.

As shown in FIGS. 1 and 2, the baffle 20 includes at least one jalousie divider 72 that is moveable to selectively regulate fluid flow between the first volume 52 and the second volume 54 based on fluid temperature within the first volume 52. The at least one jalousie divider 72 may be made of a wide variety of different materials, including without limitation, steel, aluminum, other metal alloys, or plastic. The at least one jalousie divider 72 is movable between a closed position and an open position. In the closed position, the at least one jalousie divider 72 prevents fluid flow between the first volume 52 and the second volume 54. By contrast, in the open position, the at least one jalousie divider 72 permits unrestricted flow of the fluid 23 between the first volume 52 and the second volume 54. More particularly, the at least one jalousie divider 72 includes one or more louvers 74 pivotally connected to the baffle 20 for movement between the closed position and the open position and a plurality of intermediate positions therebetween. When the louvers 74 are driven to one of the intermediate positions, fluid flow between the first volume 52 and the second volume 54 is throttled by the louvers 74.

As shown in FIG. 3, a controller 76 is coupled to the at least one jalousie divider 72 and more particularly to the louvers 74. The controller 76 selectably drives the louvers 74 to the closed position in response to the temperature of the fluid 23 in the first volume 52 being below a temperature threshold. By contrast, the controller 76 selectably drives the louvers 74 to the open position in response to the temperature of the fluid 23 in the first volume 52 being above the temperature threshold.

It should be appreciated that the temperature threshold may correspond with a specific temperature value, such as without limitation approximately sixty degrees Celsius (60° C.). As such, the controller 76 may drive the louvers 74 to the closed position or the open position when the temperature of the fluid 23 in the first volume 52 is equal to the temperature threshold. Both configurations are envisioned and are fully within the scope of the present disclosure. Alternatively, the temperature threshold may be a range of temperatures encompassing the target operating temperature of the fluid 23. By way of example and without limitation, the temperature threshold may range from approximately ten degrees Celsius (10° C.) to approximately sixty degrees Celsius (60° C.). Where the temperature threshold is a range of temperatures, the controller 76 may drive the louvers 74 to the intermediate positions in response to the temperature of the fluid 23 in the first volume 52 being within the temperature threshold. In accordance with this configuration, the intermediate positions of the louvers 74 may generally correspond with temperatures within the range of temperatures comprising the temperature threshold. For example, the louvers 74 may open to a greater extent (i.e. where the area opened up by the louvers 74 increases) as the temperature of the fluid 23 increases. As such, correspondence between the intermediate positions of the louvers 74 and the temperature of the fluid 23 may be related by way of a look-up table or an equation stored within the controller 76.

The controller 76 envisioned and disclosed may either be active or passive in its control of the at least one jalousie divider 72. As shown in FIG. 3, the controller 76 is in communication with a temperature sensor 77. The temperature sensor 77 is disposed in the first volume 52 and senses the temperature of the fluid 23 contained in the cavity 28 of the housing 26. The jalousie controller 76 may include an actuator and a control module that controls the actuator to actively position the louvers 74 of the at least one jalousie divider 72 in response to the temperature sensed by the temperature sensor 77. It should be appreciated that the control module may have non-volatile random access memory (NVRAM) for storing information including the look-up table and/or equation described above.

In this application, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip. The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

It should also be appreciated that the actuator of the controller 76 may be, without limitation, electronically, hydraulically, or pneumatically powered. The actuator of the controller 76 may include a body defining a body bore and a piston that is slidably received in the body bore and that extends from the body bore. The piston contacts and/or is coupled to the louvers 74 such that the louvers 74 move as the piston slides within the body bore. Where the actuator of the controller 76 is electronically powered, the body of the actuator may house a solenoid that applies a force to the piston by electromagnetism to slide the piston relative to the body bore. Where the actuator of the controller 76 is hydraulically or pneumatically powered, a pressurized fluid or gas may be supplied to the body bore such that the pressurized fluid or gas applies a force to the piston, which causes the piston to slide relative to the body bore.

Alternatively, where the controller 76 is passive, the controller 76 may be constructed of a thermo-sensitive bi-metal. In this configuration, at least a portion of the controller 76 is disposed within the cavity 28 of the housing 26 below the minimum fluid level 36 such that it will be submersed in the fluid 23 during operation. More specifically, the controller 76 in this configuration may be disposed within the first volume 52 such that the thermo-sensitive bi-metal material is heated by the fluid 23 contained within the first volume 52. The thermo-sensitive bi-metal material of the controller 76 expands and contracts in response to the temperature of the fluid 23 in the cavity 28 to passively position the louvers 74 of the at least one jalousie divider 72 in response to the temperature of the fluid 23 contained in the cavity 28 of the housing 26. In one non-limiting example, the controller 76 may have the shape of a flat spiral coil, where the controller 76 includes a continuous, outwardly spiraling element that is disposed within a single plane. As the thermo-sensitive bi-metal material of the controller 76 expands and contracts in response to the temperature of the fluid 23 in the cavity 28, the continuous, outwardly spiraling of the controller 76 rotates. The louvers 74 may be rotatably coupled to the continuous, outwardly spiraling element of the controller 76 such that the rotation of the continuous, outwardly spiraling element of the controller 76 results in the rotation of the louvers 74 of the at least one jalousie divider 72 in response to the temperature of the fluid 23 contained in the cavity 28 of the housing 26. In another non-limiting example, the controller 76 may have a linearly extending shape, the shape of a helical coil (e.g. linearly extending coil spring), or a zig-zag shape (e.g. accordion-like shape). As the thermo-sensitive bi-metal material of the controller 76 expands and contracts in response to the temperature of the fluid 23 in the cavity 28, the controller 76 becomes longer and shorter in overall length. The louvers 74 may be coupled to or pushed on by the controller 76 such that expansion and contraction of the controller 76 controls the position of the louvers 74 of the at least one jalousie divider 72 in response to the temperature of the fluid 23 contained in the cavity 28 of the housing 26.

Figure 6:
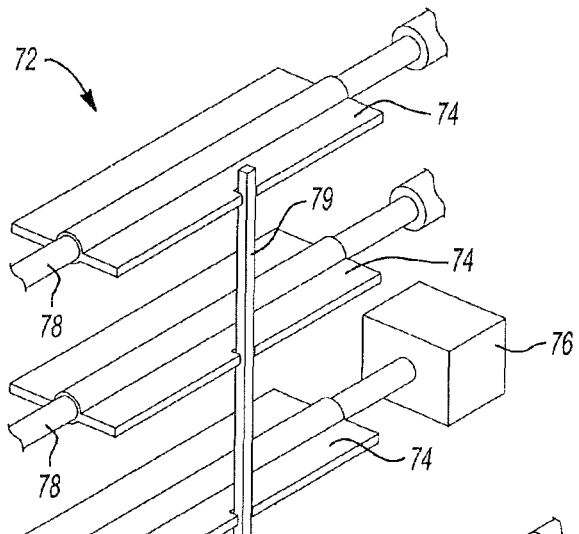
FIG. 6 is a perspective view of the jalousie divider shown in FIG. 3 where the louvers of the jalousie divider are interconnected by a link.
Figure 7:
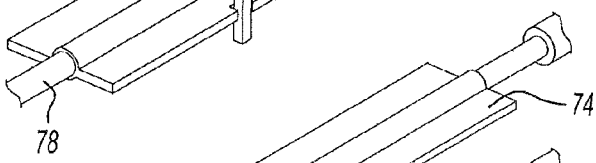
FIG. 7 is another perspective view of the jalousie divider shown in FIG. 3 where the louvers of the jalousie divider are interconnected by a plurality of gears.

With reference to FIGS. 2 and 6-7, the one or more louvers 74 of the at least one jalousie divider 72 may take the form of several structural arrangements and shapes. Generally, each louver 74 is pivotally connected to the baffle 20 by a pivot 78. The pivot 78 may be situated on either side of the louver 74 or alternatively may take the form of a bar that bisects the louver 74. The louvers 74 may have a variety of shapes, including without limitation a square or a rectangle. The one or more louvers 74 of the at least one jalousie divider 72 may be a plurality of louvers 74 that are vertically stacked with respect to one another. In this configuration, each louver 74 is coupled to the controller 76 such that the plurality of louvers 74 moves in unison when driven by the controller 76. Alternatively, the louvers 74 may be linked to one another such that if a force is applied to one of the louvers 74 by the controller 76, the other louvers 74 move therewith. In the example shown in FIG. 2, if a force is applied to a first louver 74a, a link 79 extending between and connecting the louvers 74a, 74b causes like movement of the louver 74b. Accordingly, when a force is applied to the louver 74a to move the louver 74a from the closed position to the open position shown in FIG. 2, the louver 74b is likewise moved into the open position.

Figure 8:
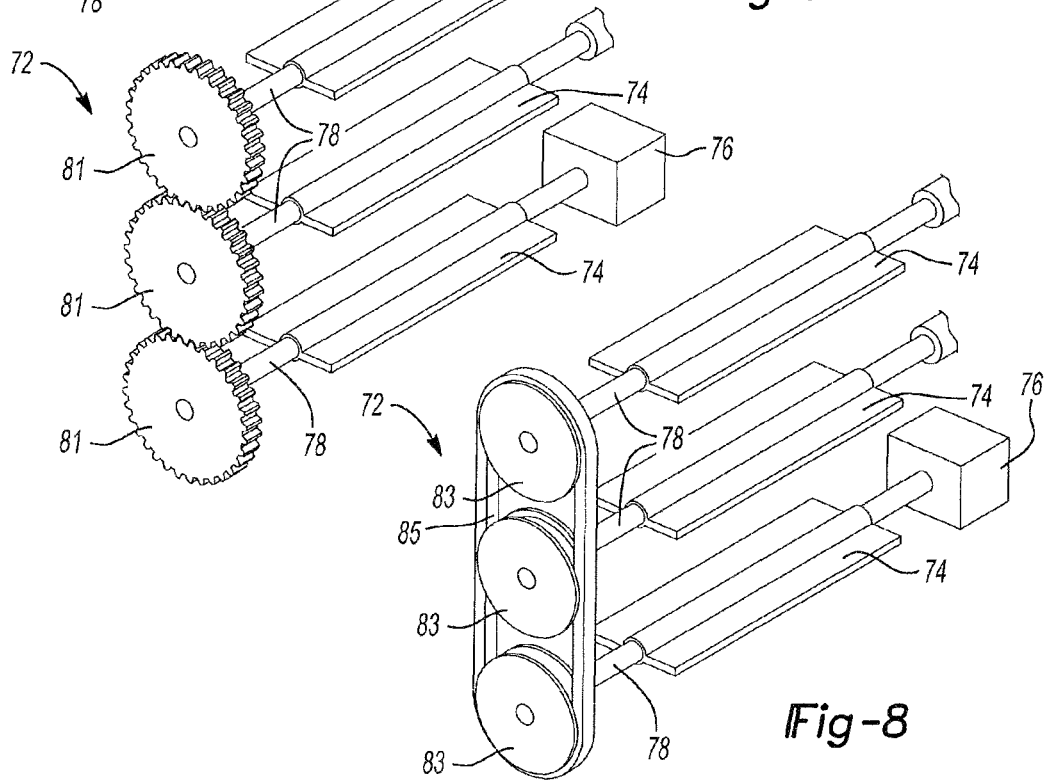
FIG. 8 is another perspective view of the jalousie divider shown in FIG. 3 where the louvers of the jalousie divider are interconnected by a plurality of pulleys and a belt.

The arrangement of the jalousie divider 72 shown in FIG. 2 is also illustrated in FIG. 6, where the link 79 is pivotally connected to each louver 74 in the plurality of louvers 74. The link 79 maintains the spacing of the plurality of louvers 74 in the jalousie divider 72 such that the plurality of louvers 74 rotate in unison when driven between the open position and closed position by the controller 76. An alternative configuration of the jalousie divider 72 is illustrated in FIG. 7, where a plurality of gears 81 synchronize the rotation of the plurality of louvers 74. The plurality of gears 81 are meshingly engaged with one another and each gear 81 in the plurality of gears 81 is connected to and supported on a respective louver 74 in the plurality of louvers 74. Accordingly, the plurality of gears 81 rotate with the plurality of louvers 74 and synchronize rotation of the plurality of louvers 74 such that the plurality of louvers 74 rotate in unison when driven by the controller 76. Another alternative configuration of the jalousie divider 72 is illustrated in FIG. 8, where a plurality of pulleys 83 and a belt 85 synchronize the rotation of the plurality of louvers 74. Each pulley 83 of the plurality of pulleys 83 is connected to and supported on a respective louver 74 of the plurality of louvers 74 for rotation therewith. The belt 85 extends between and contacts each pulley 83 such that all of the pulleys 83 in the plurality of pulleys 83 rotate in unison, thereby synchronizing rotation of the plurality of louvers 74.

As shown in FIGS. 4 and 5, when the sump 22 is in use, the first volume 52 of the cavity 28 contains fluid 23 returning from the fluid circulating system 24, which again could be without limitation the engine 24a of FIG. 1 or the transmission 24b of FIG. 2. The large arrows included in FIGS. 4 and 5 are provided for illustration purposes to generally show the movement of the fluid 23 within the cavity 28 when the plurality of louvers 74 are in the closed position (FIG. 4) and in the open position (FIG. 5). The second volume 54 contains fluid 23 that is isolated from the first volume 52 until the temperature of the fluid 23 in the second volume 54 exceeds the temperature threshold. The first volume 52 has a volumetric capacity that is selected to achieve a first residence time that is significantly shorter than the residence time associated with the entire undivided cavity 28 (i.e. the first and second volumes 52, 54 combined). By way of example and without limitation, the first residence time may range from approximately one-half of one second (0.5 seconds) to one and one-half seconds (1.5 seconds) for the fluid 23 contained in the first volume 52 while the residence time associated with the fluid 23 contained in the entire undivided cavity 28, that is the fluid 23 contained in the first volume 52 and the second volume 54, may range from approximately two and one-half seconds (2.5 seconds) to approximately three and one-half seconds (3.5 seconds).

Accordingly, when the temperature of the fluid 23 in the first volume 52 is below the temperature threshold, the at least one jalousie divider 72 acts as a barrier isolating the fluid 23 contained within the second volume 54 from the fluid 23 contained within the first volume 52. With the first volume 52 surrounding the fluid pickup 44, only the fluid 23 contained within the first volume is circulated at temperatures below the temperature threshold. Advantageously, the fluid 23 contained within the first volume 52 is warmed to the target operating temperature more quickly creating a hot zone of fluid 23 within the cavity 28 that is co-extensive with the first volume 52. The second volume 54 thus designates a cold zone and the fluid 23 contained in the second volume 54 is not circulated until it reaches or exceeds the temperature threshold. At this point, the at least one jalousie divider 72 is driven to the open position or one of the intermediate positions to allow fluid flow through the baffle 20. Accordingly, the total volumetric capacity of the cavity 28 is only utilized once the temperature of the fluid 23 in the first volume 52 meets or exceeds the temperature threshold.

Still referring to FIGS. 4 and 5, multiple jalousie dividers 72 or louvers 74 are also envisioned and are within the scope of the present disclosure. For example, the at least one jalousie divider 72 may include a first pair of jalousie dividers 80 disposed along the second portion 66 of the baffle 20. The first pair of jalousie dividers 80 may be substantially vertically oriented on opposing sides of the first volume 52. In other words, the first pair of jalousie dividers 80 may be disposed along the second portion 66 of the baffle 20 on either side of the suction tube 38 and the fluid pickup 44. As such, the first pair of jalousie dividers 80 controls the flow of fluid 23 between the second volume 54 and the lower region 70 of the first volume 52. Additionally, the at least one jalousie divider 72 may include a second pair of jalousie dividers 82 disposed along the first portion 56 of the baffle 20. The second pair of jalousie dividers 82 may be arranged on opposing sides of the opening 62, or in other words, on opposing sides of the suction tube 38. As such, the second pair of jalousie dividers 82 controls the flow of fluid 23 between the second volume 54 and the upper region 64 of the first volume 52.

Referring specifically to FIG. 4, the oil sump 22 is illustrated where the fluid 23 in the cavity 28 has not yet reached the temperature threshold. The first volume 52 contains the fluid 23 that has been circulating through the fluid circulating system 24 to create a hot zone of fluid 23 within the cavity 28 that is co-extensive with the first volume 52. The second volume 54 contains fluid 23 that is isolated from the first volume 52 until the temperature of the fluid 23 in the second volume 54 meets or exceeds the temperature threshold. This creates a cold zone of fluid 23 within the cavity 28 that is co-extensive with the second volume 54. The fluid 23 in the second volume 54 cannot flow through the second portion 66 of the baffle 20 because the first pair of jalousie dividers 80 remain in the closed position until the fluid 23 in the first volume 52 warms to a temperature that is at or above the temperature threshold. Accordingly, only the fluid 23 located in the first volume 52 may be drawn into the fluid pickup 44 for circulation through the fluid circulating system 24. The fluid 23 is then warmed by heat and friction during circulation through the fluid circulating system 24 and returns to the first volume 52 by falling into the cavity 28 of the sump 22 under the influence of gravity in the form of droplets 25. The time it takes a discrete fluid molecule to circulate through the fluid circulating system 24 is called residence time. The residence time also equals the amount of time the discrete molecule remains in the sump 22 because the minimum fluid level 36 in the housing 26 of the sump 22 is maintained at a constant level as the fluid 23 is circulated. Stated another way, the residence time is the amount of time for all of the fluid 23 in the cavity 28 to be renewed.

Still referring to FIG. 4, the fluid 23 that has been warmed during circulation in the fluid circulating system 24 collects in the upper region 64 of the first volume 52, above the first portion 56 of the baffle 20. The fluid 23 cannot flow through the first portion 56 of the baffle 20 because the second pair of jalousie dividers 82 remain in the closed position until the fluid 23 in the first volume 52 warms to a temperature that is at or above the temperature threshold. Accordingly, the first portion 56 of the baffle 20 directs the fluid 23 in the upper region 64 of the first volume 52 to the opening 62 in the first portion 56 of the baffle 20 and into the lower region 70 of the first volume 52 where it may again be drawn into the fluid pickup 44 for circulation. The fluid 23 contained in the first volume 52 is warmed first, which in turn gradually warms the adjacent oil contained in the second volume 54.

Referring specifically to FIG. 5, the sump 22 is illustrated where all of the fluid 23 in the cavity 28 has a temperature that is above the temperature threshold. Both the first volume 52 and second volume 54 contain the fluid 23 that has been circulating through the fluid circulating system 24 creating a hot zone of fluid within the entire cavity 28 of the housing 26. With the first pair of jalousie dividers 80 and the second pair of jalousie dividers 82 in the open position, the fluid 23 readily flows through the baffle 20 such that the fluid 23 circulates between the first volume 52 and the second volume 54. The fluid 23 is drawn into the fluid pickup 44 for circulation through the fluid circulating system 24. The fluid 23 then returns initially to the upper region 64 of the first volume 52 by falling into the cavity 28 of the sump 22 under the influence of gravity in the form of droplets 25. From there, the fluid 23 either flows directly through the first volume 52 to the fluid pickup 44 or passes through the second pair of jalousie dividers 82 from the upper region 64 of the first volume 52 to the second volume 54 and though the first pair of jalousie dividers 80 from the second volume 54 to the lower region 70 of the first volume 52 where the fluid pickup 44 is located.

The foregoing description of the embodiments has been provided for the purposes of illustration and description. It is not intended to be exhaustive or limiting. Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A sump for collecting engine oil or transmission fluid comprising:
   a housing presenting a cavity and an open top;
   a fluid pickup disposed within said cavity;
   a baffle disposed inside said housing dividing said cavity into a first volume around said fluid pickup and a second volume disposed outwardly of said first volume, said baffle including at least one jalousie divider that is movable to regulate fluid flow between said first volume and said second volume, wherein said at least one jalousie divider includes a plurality of louvers that are pivotally connected to said baffle and that are disposed next to one another in a stacked arrangement, wherein said plurality of louvers includes at least a first louver and a second louver, each of said first and second louvers being pivotally connected to said baffle by a bar;

a controller directly coupled to said bar of said first louver to operably rotate said first louver relative to said baffle; and a link extending between said first and second louvers that is pivotally connected to each of said first and second louvers such that said second louver rotates in unison with said first louver when said controller rotatably drives said first louver.

2. A sump as set forth in claim 1 wherein said at least one jalousie divider is movable between a closed position that prevents fluid flow between said first volume and said second volume and an open position that allows fluid flow between said first volume and said second volume.

3. A sump as set forth in claim 1 wherein said housing is connected to an engine and said cavity collects engine oil.

4. A sump as set forth in claim 1 wherein said housing is connected to a transmission and said cavity collects transmission fluid.

5. A sump for collecting engine oil or transmission fluid comprising:

a housing including a bottom wall and a side wall that together define a cavity having an open top;

a fluid pickup disposed within said cavity;

a baffle disposed inside said housing dividing said cavity into a first volume around said fluid pickup and a second volume adjacent said side wall, said baffle including at least one jalousie divider;

a controller that selectively positions said jalousie divider to regulate fluid flow between said first volume and said second volume based on a fluid temperature within said first volume, wherein said at least one jalousie divider includes a plurality of louvers that are pivotally connected to said baffle and that are disposed next to one another in a stacked arrangement, wherein said plurality of louvers includes at least a first louver and a second louver, each of said first and second louvers being pivotally connected to said baffle by a bar, wherein said controller is directly coupled to said bar of said first louver to operably rotate said first louver relative to said baffle; and a link extending between said first and second louvers that is pivotally connected to each of said first and second louvers such that said second louver rotates in unison with said first louver when said controller rotatably drives said first louver.

6. A sump as set forth in claim 5 wherein said at least one jalousie divider is movable between a closed position where said at least one jalousie divider obstructs fluid flow between said first volume and said second volume and an open position where said at least one jalousie divider permits fluid flow between said first volume and said second volume.

7. A sump as set forth in claim 6 wherein said controller:

selectively drives said at least one jalousie divider to said closed position in response to said fluid temperature being below a temperature threshold; and selectively drives said at least one jalousie divider to said open position in response to said fluid temperature being above said temperature threshold.

8. A sump as set forth in claim 7 wherein each louver of said plurality of louvers is pivotally connected to said baffle for rotational movement relative to said baffle when said at least one jalousie divider moves between said closed position and said open position and a plurality of intermediate positions therebetween where fluid flow between said first volume and said second volume is throttled by said plurality of louvers.

9. A sump as set forth in claim 8 wherein said temperature threshold is a range of temperatures.

10. A sump as set forth in claim 9 wherein said controller drives said plurality of louvers to one of said intermediate positions in response to said fluid temperature being within said range of temperatures comprising said temperature threshold.

11. A sump as set forth in claim 7 wherein said controller is in communication with a temperature sensor that is disposed within said first volume and that senses said fluid temperature, and wherein said controller actively controls said at least one jalousie divider in response to said fluid temperature sensed by said temperature sensor.

12. A sump as set forth in claim 7 wherein said controller includes a thermo-sensitive bi-metal that expands and contracts in response to said fluid temperature to passively control said at least one jalousie divider in response to said fluid temperature.

13. A sump as set forth in claim 7 wherein said first volume contains fluid returning from a fluid circulating system and said second volume contains fluid that is isolated from said first volume until said fluid temperature exceeds said temperature threshold.

14. A sump as set forth in claim 5 wherein said baffle includes a first portion having an outside edge abutting said side wall and an inner edge spaced from said outside edge to define an opening in said first portion of said baffle.

15. A sump as set forth in claim 14 wherein said first portion of said baffle defines an upper region of said first volume adjacent said open top of said cavity and wherein said upper region of said first volume is positioned above said opening in said first portion of said baffle.

16. A sump as set forth in claim 15 wherein said baffle includes a second portion extending downwardly from said inner edge of said first portion to a lower edge abutting said bottom wall to define a lower region of said first volume surrounding said fluid pickup.

17. A sump as set forth in claim 16 wherein said at least one jalousie divider includes a first pair of jalousie dividers disposed along said second portion of said baffle on opposing sides of said lower region of said first volume.

18. A sump as set forth in claim 17 wherein said at least one jalousie divider further includes a second pair of jalousie dividers disposed along said first portion of said baffle on opposing sides of said opening.

19. A sump as set forth in claim 17 wherein said first portion of said baffle includes at least one window that allows fluid to flow from said upper region of said first volume into said second volume.

20. A baffle for disposition in a sump containing a fluid such as engine oil or transmission fluid, said baffle comprising:

a first portion having an outside edge that abuts a side wall of the sump and an inner edge spaced from said outside edge that defines an opening in said first portion of said baffle;

a second portion extending downwardly from said inner edge of said first portion of said baffle to a lower edge abutting a bottom wall of the sump;

at least one jalousie divider disposed along said second portion of said baffle, said at least one jalousie divider being moveable to regulate flow of the fluid through said second portion of said baffle based on a temperature of the fluid, wherein said at least one jalousie divider includes a plurality of louvers that are pivotally connected to said second portion of said baffle, wherein said plurality of louvers includes at least a first louver and a second louver, each of said first and second louvers being pivotally connected to said baffle by a bar, a controller directly coupled to said bar of said first louver to operably rotate said first louver relative to said baffle; and a link extending between said first and second louvers that is pivotally connected to each of said first and second louvers such that said second louver rotates in unison with said first louver when said controller rotatably drives said first louver.

21. A baffle as set forth in claim 20 wherein said at least one jalousie divider is movable between a closed position that prevents the fluid from passing through said second portion of said baffle and an open position that allows the fluid to flow through said second portion of said baffle.

22. A baffle as set forth in claim 21
wherein said controller selectively drives said at least one jalousie divider to said closed position in response to the temperature of the fluid being below a temperature threshold and that selectively drives said at least one jalousie divider to said open position in response to the temperature of the fluid being above said temperature threshold.

23. A baffle as set forth in claim 22 wherein said controller includes a temperature sensor that senses the temperature of the fluid contained in the sump and wherein said controller is operable to control movement of said at least one jalousie divider in response to the temperature sensed by said temperature sensor.

24. A baffle as set forth in claim 22 wherein said controller includes a thermo-sensitive bi-metal that expands and contracts in response to the temperature of the fluid and said controller passively controls said at least one jalousie divider in response to the temperature of the fluid.

25. A baffle as set forth in claim 20 wherein at least one jalousie divider includes another plurality of louvers that are pivotally connected to said first portion of said baffle.

26. A baffle as set forth in claim 25 wherein said first portion of said baffle is generally flat and said second portion of said baffle has a rectangular shape.

27. A baffle as set forth in claim 25 wherein said first portion of said baffle is generally flat and said second portion of said baffle has a pyramid shape that becomes increasingly narrow progressing from said opening to said lower edge.

28. A baffle as set forth in claim 25 wherein said first portion of said baffle is generally flat and said second portion of said baffle has a pyramid shape that becomes increasingly wide progressing from said opening to said lower edge.

* * * * *